(12) United States Patent
Tan et al.

(10) Patent No.: US 10,941,715 B2
(45) Date of Patent: Mar. 9, 2021

(54) PRESSURE COUPLED CONTROL METHOD AND SYSTEM FOR DIFFUSION COMBUSTION OF NATURAL GAS ENGINE

(71) Applicant: Weichai Power Co., Ltd., Shandong (CN)

(72) Inventors: Xuguang Tan, Shandong (CN); Dongchao Su, Shandong (CN); Junyin Li, Shandong (CN); Shitong Liu, Shandong (CN)

(73) Assignee: Weichai Power Co., Ltd., Shandong (CN)

( * ) Notice: Subject to any disclaimer, the term of this patent is extended or adjusted under 35 U.S.C. 154(b) by 0 days.

(21) Appl. No.: 16/992,522

(22) Filed: Aug. 13, 2020

(65) Prior Publication Data

US 2020/0370482 A1    Nov. 26, 2020

Related U.S. Application Data

(63) Continuation of application No. PCT/CN2018/093796, filed on Jun. 29, 2018.

(30) Foreign Application Priority Data

Jun. 21, 2018   (CN) .......................... 201810645725.4

(51) Int. Cl.
| | |
|---|---|
| *F02D 19/08* | (2006.01) |
| *F02D 19/10* | (2006.01) |
| *F02D 41/38* | (2006.01) |

(52) U.S. Cl.
CPC ........... *F02D 19/081* (2013.01); *F02D 19/08* (2013.01); *F02D 41/3827* (2013.01);
(Continued)

(58) Field of Classification Search
CPC .... F02D 19/08; F02D 19/081; F02D 19/0605; F02D 19/0628; F02D 19/0642;
(Continued)

(56) References Cited

U.S. PATENT DOCUMENTS

| | | | |
|---|---|---|---|
| 2014/0136079 A1 | 5/2014 | Sivasubramanian et al. | |
| 2014/0331963 A1* | 11/2014 | Grant | F02D 19/0694 123/304 |

(Continued)

FOREIGN PATENT DOCUMENTS

| | | |
|---|---|---|
| CN | 202001119 U | 10/2011 |
| CN | 104121102 A | 10/2014 |
| JP | 2007-085203 A | 4/2007 |

OTHER PUBLICATIONS

First Office Action dated Aug. 1, 2019 received in Chinese Patent Application No. CN 201810645725.4 together with an English language translation.

(Continued)

*Primary Examiner* — George C Jin
(74) *Attorney, Agent, or Firm* — Scully Scott Murphy & Presser

(57) ABSTRACT

The present invention relates to a pressure coupled control method and system for diffusion combustion of a natural gas engine, the method comprising: S11: detecting an operating condition of a natural gas engine; S12: an electronic control unit calculating a target diesel fuel pressure value flowing into a fuel rail of the natural gas engine according to the operating condition, and detecting an actual diesel fuel pressure value flowing into the fuel rail by means of a diesel pressure sensor in the fuel rail; S13: the electronic control unit calculating a target natural gas pressure value flowing into a gas rail of the natural gas engine according to the actual diesel fuel pressure value, and regulating a natural gas flowing into the gas rail by means of a signal of a gas rail (Continued)

pressure sensor in the gas rail; S14: after the target diesel fuel pressure value and the target natural gas pressure value are established, successively injecting high pressure diesel fuel and a high pressure natural gas into a gas cylinder; S15: detecting in real time a real-time operating condition of the natural gas engine, and promptly regulating the target diesel fuel pressure value and the target natural gas pressure value according to the real-time operating condition. The present invention improves diffusion combustion efficiency by means of the pressure coupled control of diesel fuel and natural gas.

10 Claims, 2 Drawing Sheets

(52) U.S. Cl.
CPC .......... *F02D 41/3836* (2013.01); *F02D 19/10* (2013.01); *F02D 2041/3881* (2013.01)

(58) Field of Classification Search
CPC ...... F02D 19/10; F02D 19/12; F02D 41/3827; F02D 41/3836; F02D 41/0027; F02D 41/1497; F02D 41/38; F02D 2041/3881; F02D 2041/389
See application file for complete search history.

(56) References Cited

U.S. PATENT DOCUMENTS

2015/0075488 A1\* 3/2015 Touchette ........... F02D 19/0628
123/299
2015/0354473 A1\* 12/2015 Ensan ................. F02D 41/3836
123/526

OTHER PUBLICATIONS

International Search Report dated Mar. 21, 2019 received in International Application No. PCT/CN2018/093796.

\* cited by examiner

PRESSURE COUPLED CONTROL METHOD AND SYSTEM FOR DIFFUSION COMBUSTION OF NATURAL GAS ENGINE

CROSS-REFERENCE TO RELATED APPLICATIONS

The present application is a continuation of PCT International Application No. PCT/CN2018/093796, filed on Jun. 29, 2018, which claims the priority of Chinese Patent Application No. 201810645725.4, filed with the Chinese Patent Office on Jun. 21, 2018, the entire contents of each of which are herein incorporated by reference for all purposes. No new matter has been introduced.

TECHNICAL FIELD

The present disclosure relates to the technical field of natural gas engines, and in particular relates to a pressure coupled control method and system for diffusion combustion of a natural gas engine.

BACKGROUND

This section provides only background information related to the present disclosure, which is not necessarily prior art of the present disclosure.

At present, most natural gas engines use premixed combustion technology, in which natural gas is mixed with air in an intake pipe, the mixed gas enters a cylinder and is ignited by a spark plug before compression top dead center, and then is combusted to do work. There are some problems in the actual application of natural gas engines; for example, the premixed combustion of natural gas has poor responsiveness, high thermal load and low reliability, and is prone to knocking, etc. These problems greatly limit the improvement of engine compression ratio and burst pressure, making it difficult to further improve the thermal efficiency of the engine.

In order to overcome the above-mentioned problems in the practical application of natural gas engines and improve the efficiency of diffusion combustion of the natural gas, research and development (R&D) personnel often use the diffusion combustion method of injecting the natural gas directly into the cylinder and igniting the natural gas with a small amount of diesel fuel. Although this diffusion combustion method can solve the knocking problem very well and improve the compression ratio and thermal efficiency of the natural gas engine, there are still some problems in the actual application process. For example, the natural gas pressure and the diesel fuel pressure of the natural gas and the diesel fuel injected into the cylinder are determined by an operating condition of the engine; that is, when the operating condition of the engine is determined, the natural gas pressure and the diesel fuel pressure of the natural gas and the diesel fuel injected into the cylinder will be determined accordingly. In this process, there is no direct connection between the natural gas pressure and the diesel fuel pressure, and the main role of the diesel fuel is to ignite the natural gas. Therefore, this diffusion combustion method will result in insufficient matching of the natural gas pressure and the diesel fuel pressure, which ultimately leads to a greatly reduced effect of igniting the natural gas by the diesel fuel.

SUMMARY

An object of the present disclosure is to propose a pressure coupled control method for diffusion combustion of a natural gas engine in view of the deficiencies of the above-mentioned prior art. By performing pressure coupled control on the diesel fuel and natural gas injected into the natural gas engine, this method enables the diesel fuel and the natural gas injected into the natural gas engine to be fully combusted, thereby improving the diffusion combustion efficiency of the natural gas engine. This object is achieved through the following technical solutions.

A first aspect of the present disclosure provides a pressure coupled control method for diffusion combustion of a natural gas engine. The pressure coupled control method for diffusion combustion of the natural gas engine includes the following steps: S11: detecting an operating condition of the natural gas engine; S12: calculating, by an electronic control unit, a target diesel fuel pressure value of diesel fuel flowing into an fuel rail of the natural gas engine according to the operating condition of the engine, and detecting an actual diesel fuel pressure value of the diesel fuel flowing into the fuel rail through a diesel fuel pressure sensor in the fuel rail; S13: calculating, by the electronic control unit, a target natural gas pressure value of natural gas flowing into a gas rail of the natural gas engine according to the actual diesel fuel pressure value, and adjusting the natural gas flowing into the gas rail through a signal of a gas rail pressure sensor in the gas rail; S14: after the target diesel fuel pressure value and the target natural gas pressure value are established, injecting high-pressure diesel fuel and high-pressure natural gas into a cylinder sequentially; and S15: detecting a real-time operating condition of the natural gas engine in real-time, and timely adjusting the target diesel fuel pressure value and the target natural gas pressure value according to the real-time operating condition.

Further, step S11 includes: detecting the operating condition of the natural gas engine according to an accelerator signal and a speed signal of the natural gas engine.

Further, the natural gas engine is provided with a high-pressure fuel pump and the fuel rail that are located between an fuel tank and the cylinder, wherein the fuel rail is used to store high-pressure diesel fuel, the diesel fuel pressure sensor is disposed in the fuel rail, and step S12 includes: S121: forming high-pressure diesel in the fuel rail by controlling an fuel-pumping volume of the high-pressure fuel pump according to the target diesel fuel pressure value; and S122: detecting the actual diesel fuel pressure value of the high-pressure diesel fuel flowing into the fuel rail through the diesel fuel pressure sensor, and adjusting the fuel-pumping volume of the high-pressure fuel pump according to the actual diesel fuel pressure value, so that the pressure value of the high-pressure diesel fuel in the fuel rail reaches the target diesel fuel pressure value.

Further, the natural gas engine is provided with a natural gas pump and the gas rail that are located between a natural gas bottle and the cylinder, wherein the gas rail is used to store high-pressure natural gas, a natural gas pressure sensor is disposed in the gas rail, and step S13 includes: S131: forming high-pressure natural gas in the gas rail by controlling a gas-pumping volume of the natural gas pump according to the actual diesel fuel pressure value; and S132: adjusting the gas-pumping volume of the natural gas pump according to a natural gas pressure signal of the natural gas pressure sensor in the gas rail so that the pressure value of the high-pressure natural gas in the gas rail reaches the target natural gas pressure value.

Further, step S14 includes: S141: controlling an fuel injection nozzle to inject the high-pressure diesel fuel into the cylinder with a first injection pulse width at a first injection timing; and S142: controlling a gas injection nozzle to inject the high-pressure natural gas into the cylinder with a second injection pulse width at a second injection timing.

A second aspect of the present disclosure also provides a pressure coupled control system for diffusion combustion of a natural gas engine, which includes: a detection unit, which is connected to an electronic control unit of the natural gas engine and which is configured to detect an operating condition of the natural gas engine and send the operating condition to the electronic control unit; a first computing unit, which is integrated in the electronic control unit and which is configured to calculate a target diesel fuel pressure value of diesel fuel flowing into an fuel rail of the natural gas engine according to the operating condition and detect an actual diesel fuel pressure value of the diesel fuel flowing into the fuel rail through a diesel fuel pressure sensor in the fuel rail; a second computing unit, which is integrated in the electronic control unit and which is configured to calculate a target natural gas pressure value of natural gas flowing into a gas rail of the natural gas engine according to the actual diesel fuel pressure value and adjust the natural gas flowing into the gas rail through a signal of a gas rail pressure sensor in the gas rail; and an injection unit, which is configured to inject high-pressure diesel fuel and high-pressure natural gas into a cylinder sequentially after the target diesel fuel pressure value and the target natural gas pressure value are established.

Further, the detection unit includes: an accelerator pedal displacement sensor, which is configured to detect an accelerator signal of the accelerator pedal; and a phase sensor, which is disposed on the natural gas engine to detect a speed signal of the natural gas engine.

Further, the natural gas engine is provided with a high-pressure fuel pump and the fuel rail that are located between an fuel tank and the cylinder, wherein the fuel rail is used to store high-pressure diesel fuel, and the pressure coupled control system for diffusion combustion of the natural gas engine further includes: a diesel fuel pressure adjustment unit, which is integrated in the high-pressure fuel pump and connected with the electronic control unit, and which controls an fuel-pumping volume of the high-pressure fuel pump according to the target diesel fuel pressure value so that high-pressure diesel is formed in the fuel rail; and a diesel fuel pressure sensor, which is disposed in the fuel rail and connected to the diesel fuel pressure adjustment unit, and which is configured to detect the actual diesel fuel pressure value of the high-pressure diesel fuel flowing into the fuel rail, wherein the diesel fuel pressure adjustment unit adjusts the fuel-pumping volume of the high-pressure fuel pump according to the actual diesel fuel pressure value, so that the pressure value of the high-pressure diesel fuel in the fuel rail reaches the target diesel fuel pressure value.

Further, the natural gas engine is provided with a natural gas pump and the gas rail that are located between a natural gas bottle and the cylinder, wherein the gas rail is used to store high-pressure natural gas, and the pressure coupled control system for diffusion combustion of the natural gas engine further includes: a natural gas pressure adjustment unit, which is connected to the electronic control unit and the natural gas pump respectively, and which controls a gas-pumping volume of the natural gas pump according to the actual diesel fuel pressure value to form high-pressure natural gas in the gas rail; and a natural gas pressure sensor, which is disposed in the gas rail and connected to the natural gas pressure adjustment unit, wherein the natural gas pressure adjustment unit adjusts the gas-pumping volume of the natural gas pump according to a natural gas pressure signal of the natural gas pressure sensor in the gas rail so that the pressure value of the high-pressure natural gas in the gas rail reaches the target natural gas pressure value.

Further, the pressure coupled control system for diffusion combustion of the natural gas engine further includes: an fuel injection solenoid valve, which is connected to the electronic control unit, wherein the electronic control unit controls an fuel injection nozzle through the fuel injection solenoid valve to inject the high-pressure diesel fuel into the cylinder with a first injection pulse width at a first injection timing; and a gas injection solenoid valve, which is connected to the electronic control unit, wherein the electronic control unit controls a gas injection nozzle through the gas injection solenoid valve to inject the high-pressure natural gas into the cylinder with a second injection pulse width at a second injection timing.

Those skilled in the art can understand that in the technical solutions of the present disclosure, the diesel fuel and natural gas injected into the natural gas engine are pressure-coupled so that the diesel fuel and natural gas injected into the natural gas engine are fully combusted, thereby increasing the diffusion combustion efficiency of the natural gas engine. Specifically, the electronic control unit of the present disclosure calculates the target diesel fuel pressure value of the diesel fuel flowing into the fuel rail of the natural gas engine according to the operating condition of the engine, and detects the actual diesel fuel pressure value of the diesel fuel flowing into the fuel rail by the diesel fuel pressure sensor in the fuel rail; then, the electronic control unit calculates the target natural gas pressure value of the natural gas flowing into the gas rail of the natural gas engine according to the actual diesel fuel pressure value; finally, high-pressure diesel fuel and high-pressure natural gas are injected into the cylinder sequentially by taking the target diesel fuel pressure value and the target natural gas pressure value as targets so as to realize a pressure-coupled control of the natural gas and diesel fuel injected into the cylinder so that the high-pressure natural gas injected into the cylinder can be fully diffused and combusted in the fire core formed by the high-pressure diesel fuel, thereby reducing the possible phenomena of knocking and burst pressure of the natural gas engine; at the same time, the compression ratio, power per liter and thermal efficiency of the natural gas engine are effectively improved.

Further, the present disclosure also provides a pressure coupled control system for diffusion combustion of a natural gas engine, which includes a detection unit for detecting the operating condition of the natural gas engine, and a first computing unit and a second computing unit for calculating the target diesel fuel pressure value and the target natural gas pressure value according to the operating condition of the natural gas engine, wherein the electronic control unit stores high-pressure diesel fuel in the fuel rail according to the target diesel fuel pressure value, and stores high-pressure natural gas in the gas rail according to the target natural gas pressure value; then the fuel injection solenoid valve is used to inject the high-pressure diesel fuel in the fuel injection nozzle into the cylinder with the first injection pulse width at the first injection timing, and finally the gas injection solenoid valve is used to inject the high-pressure natural gas in the gas injection nozzle into the cylinder with the second injection pulse width at the second injection timing, so that the high-pressure natural gas injected into the cylinder can be fully diffused and combusted in the fire core formed by the high-pressure diesel fuel, thereby improving the diffusion combustion efficiency of the natural gas engine.

BRIEF DESCRIPTION OF THE DRAWINGS

Upon reading the detailed description of the preferred embodiments below, various other advantages and benefits will become clear to those of ordinary skill in the art. The drawings are only for the purpose of illustrating the preferred embodiments, and should not be considered as limiting the present disclosure. Furthermore, identical parts are denoted by identical reference signs throughout the drawings. In the drawings.

Figure 1:
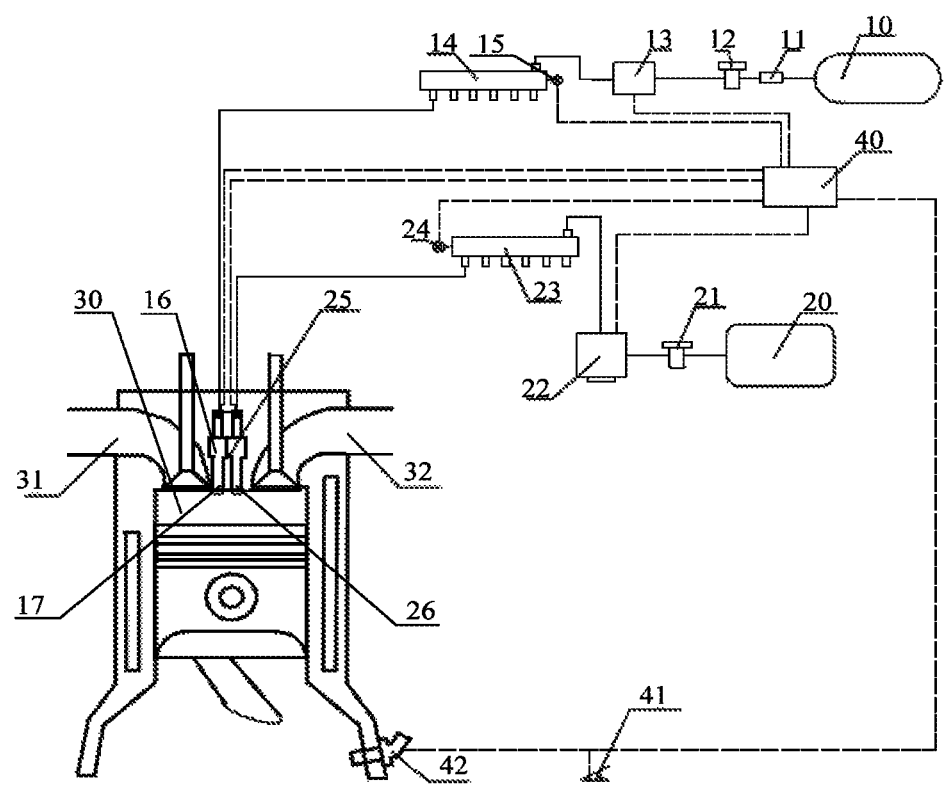
FIG. 1 is a schematic structural diagram of a pressure coupled control system for diffusion combustion of a natural gas engine according to an embodiment of the present disclosure.

List of reference signs: 10: natural gas bottle; 11: natural gas pump; 12: natural gas filter; 13: natural gas pressure adjustment unit; 14: gas rail; 15: natural gas pressure sensor; 16: gas injection solenoid valve; 17: gas injection nozzle; 20: fuel tank; 21: fuel filter; 22: high-pressure fuel pump; 23: fuel rail; 24: diesel fuel pressure sensor; 25: fuel injection solenoid valve; 26: fuel injection nozzle; 30: cylinder; 31: intake pipe; 32: exhaust pipe; 40: electronic control unit; 41: accelerator pedal; 42: phase sensor.

DETAILED DESCRIPTION

Hereinafter, exemplary embodiments of the present disclosure will be described in more detail with reference to the accompanying drawings. Although the exemplary embodiments of the present disclosure are shown in the drawings, it should be understood that the present disclosure may be implemented in various forms and should not be limited by the embodiments set forth herein. Rather, these embodiments are provided to enable a more thorough understanding of the present disclosure and to fully convey the scope of the present disclosure to those skilled in the art. It should be noted that the present disclosure is described by applying the pressure coupled control method and system for diffusion combustion of an engine to a natural gas engine, but it is not intended to limit the application range of the pressure coupled control method and system for diffusion combustion of an engine of the present disclosure. For example, the pressure coupled control method and system for diffusion combustion of an engine of the present disclosure may also be used in other engine systems with similar mixed diffusion combustion. This adjustment does not deviate from the scope of protection of the pressure coupled control method and system for diffusion combustion of an engine of the present disclosure.

FIG. 1 is a schematic structural diagram of a pressure coupled control system for diffusion combustion of a natural gas engine according to an embodiment of the present disclosure.

As shown in FIG. 1, the present disclosure provides a pressure coupled control system for diffusion combustion of a natural gas engine. The system includes a cylinder 30, an intake pipe 31 and an exhaust pipe 32 disposed on both sides of the cylinder 30, and a diesel fuel system and a natural gas system in communication with the top of the cylinder 30. The diesel fuel system includes an fuel tank 20, an fuel filter 21, a high-pressure fuel pump 22, a diesel fuel pressure adjustment unit (not shown) integrated in the high-pressure fuel pump 22 and connected to an electronic control unit 40, an fuel rail 23, an fuel injection solenoid valve 25 and an fuel injection nozzle 26 disposed on the cylinder 30, which are connected in sequence. The natural gas system includes a natural gas bottle 10, a natural gas pump 11, a natural gas filter 12, a natural gas pressure adjustment unit 13, a gas rail 14, a natural gas pressure sensor 15, a gas injection solenoid valve 16, and a gas injection nozzle 17 disposed on the cylinder 30, which are connected in sequence. Further, the system further includes a detection unit, which is connected to the electric control unit 40 of the natural gas engine and which is configured to detect an operating condition of the natural gas engine and send the operating condition to the electronic control unit 40. The detection unit includes: an accelerator pedal displacement sensor disposed at an accelerator pedal 41, wherein the accelerator pedal displacement sensor is configured to detect an accelerator signal of the accelerator pedal 41; and a phase sensor 42, which is disposed on the natural gas engine and which is configured to detect a speed signal of the natural gas engine. A first computing unit is integrated in the electronic control unit 40, and is configured to calculate a target diesel fuel pressure value of diesel fuel flowing into the fuel rail 23 of the natural gas engine according to the operating condition and detect an actual diesel fuel pressure value of the diesel fuel flowing into the fuel rail 23 through a diesel fuel pressure sensor 24 in the fuel rail 23. A second computing unit is also integrated in the electronic control unit 40, and is configured to calculate a target natural gas pressure value of natural gas flowing into the gas rail 14 of the natural gas engine according to the actual diesel fuel pressure value and adjust the natural gas flowing into the gas rail 14 through a signal of a gas rail pressure sensor in the gas rail 14. The system further includes an injection unit, which is configured to inject high-pressure diesel fuel and high-pressure natural gas into the cylinder 30 sequentially after the target diesel fuel pressure value and the target natural gas pressure value are established. In the present disclosure, the diesel fuel and natural gas injected into the natural gas engine are pressure-coupled so that the diesel fuel and natural gas injected into the natural gas engine are fully combusted, thereby increasing the diffusion combustion efficiency of the natural gas engine. Specifically, the electronic control unit 40 of the present disclosure calculates the target diesel fuel pressure value of the diesel fuel flowing into the fuel rail 23 of the natural gas engine according to the operating condition of the engine, and detects the actual diesel fuel pressure value of the diesel fuel flowing into the fuel rail 23 through the diesel fuel pressure sensor 24 in the fuel rail 23; then, the electronic control unit 40 calculates the target natural gas pressure value of the natural gas flowing into the gas rail 14 of the natural gas engine according to the actual diesel fuel pressure value; finally, high-pressure diesel fuel and high-pressure natural gas are injected into the cylinder 30 sequentially by taking the target diesel fuel pressure value and the target natural gas pressure value as targets so as to realize a pressure-coupled control of the pressures of the natural gas and diesel fuel injected into the cylinder 30 so that the high-pressure natural gas injected into the cylinder 30 can be fully diffused and combusted in the fire core formed by the high-pressure diesel fuel, thereby reducing the possible phenomena of knocking and burst pressure of the natural gas engine; at the same time, the compression ratio, power per liter and thermal efficiency of the natural gas engine are effectively improved.

With continued reference to FIG. 1, according to the embodiment of the present disclosure, the diesel fuel pressure adjustment unit of the present disclosure is integrated in the high-pressure fuel pump 22 and connected with the electronic control unit 40, and controls an fuel-pumping volume of the high-pressure fuel pump 22 according to the target diesel fuel pressure value so that high-pressure diesel is formed in the fuel rail 23. The diesel fuel pressure sensor 24 of the present disclosure is disposed in the fuel rail 23 and connected to the diesel fuel pressure adjustment unit, and the diesel fuel pressure adjustment unit adjusts the fuel-pumping volume of the high-pressure fuel pump 22 according to the diesel fuel pressure signal of the diesel fuel pressure sensor 24 in the fuel rail 23, so that the pressure value of the high-pressure diesel fuel in the fuel rail 23 reaches the target diesel fuel pressure value. Specifically, the diesel fuel pressure adjustment unit is integrated in the high-pressure fuel pump 22 and is connected to the diesel fuel pressure sensor 24 and the electronic control unit 40 respectively for transmitting the diesel fuel pressure signal of the diesel fuel pressure sensor 24 to the electronic control unit 40. The diesel fuel pressure adjustment unit is also capable of adjusting the fuel-pumping volume of the high-pressure fuel pump 22 according to a control signal of the electronic control unit 40 so that the pressure value of the high-pressure diesel fuel in the fuel rail 23 reaches the target diesel fuel pressure value. It should be noted that since the diesel fuel pressure adjustment unit of the present disclosure uses an electronically controlled diesel fuel pressure adjustment unit, it has the advantages of high accuracy, fast response, and high reliability.

With continued reference to FIG. 1, according to the embodiment of the present disclosure, the natural gas pressure adjustment unit 13 of the present disclosure is connected to the electronic control unit 40 and the natural gas pump 11 respectively, and controls a gas-pumping volume of the natural gas pump 11 according to the actual diesel fuel pressure value to form high-pressure natural gas in the gas rail 14. The natural gas pressure sensor 15 of the present disclosure is disposed in the gas rail 14 and connected to the natural gas pressure adjustment unit 13, and the natural gas pressure adjustment unit 13 adjusts the gas-pumping volume of the natural gas pump 11 according to a natural gas pressure signal of the natural gas pressure sensor 15 in the gas rail 14 so that the pressure value of the high-pressure natural gas in the gas rail 14 reaches the target natural gas pressure value. Specifically, the natural gas pressure adjustment unit 13 is disposed between the natural gas pump 11 and the gas rail 14 and is connected to the natural gas pressure sensor 15 and the electronic control unit 40 respectively for transmitting the natural gas pressure signal of the natural gas pressure sensor 15 to the electronic control unit 40. The natural gas pressure adjustment unit 13 is also capable of adjusting the gas-pumping volume of the natural gas pump 11 according to a control signal of the electronic control unit 40 so that the pressure value of the high-pressure natural gas in the gas rail 14 reaches the target natural gas pressure value. It should be noted that since the natural gas pressure adjustment unit 13 of the present disclosure uses an electronically controlled natural gas pressure adjustment unit, it has the advantages of high accuracy, fast response, and high reliability.

With continued reference to FIG. 1, according to the embodiment of the present disclosure, the electronic control unit 40 of the present disclosure controls the fuel injection nozzle 26 through the fuel injection solenoid valve 25 to inject the high-pressure diesel fuel into the cylinder 30 with a first injection pulse width at a first injection timing, and then the gas injection solenoid valve 16 controls the gas injection nozzle 17 through the gas injection solenoid valve 16 to inject the high-pressure natural gas into the cylinder 30 with a second injection pulse width at a second injection timing. Specifically, after the fuel pressure value of the high-pressure diesel fuel in the fuel rail 23 reaches the target diesel fuel pressure value and the gas pressure value of the high-pressure natural gas in the gas rail 14 reaches the target natural gas pressure value, the electronic control unit 40 accurately controls the first injection timing and the first injection pulse width of the high-pressure diesel fuel through the fuel injection solenoid valve 25 located at the fuel injection nozzle 26 of the cylinder 30 so that the high-pressure diesel fuel is compression-combusted in the cylinder 30. Finally, the electronic control unit 40 accurately controls the second injection timing and the second injection pulse width of the high-pressure natural gas through the gas injection solenoid valve 16 located at the gas injection nozzle 17 so that the high-pressure natural gas is diffusion-combusted in the fire core formed by the high-pressure diesel fuel, thereby reducing the phenomena of knocking and burst pressure existing in ordinary premixed combustion and spark plug ignition engines; at the same time, the compression ratio, power per liter and thermal efficiency of the natural gas engine are effectively improved.

Figure 2:
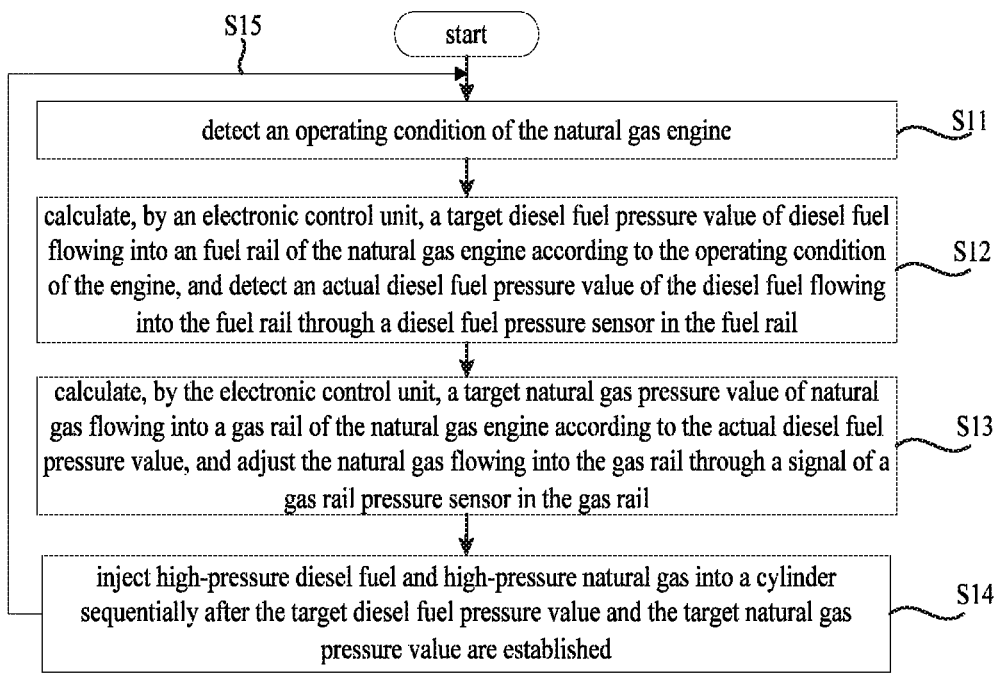
FIG. 2 is a schematic flowchart of a pressure coupled control method for diffusion combustion of a natural gas engine according to an embodiment of the present disclosure.

FIG. 2 is a schematic flowchart of a pressure coupled control method for diffusion combustion of a natural gas engine according to an embodiment of the present disclosure.

With continued reference to FIG. 1 and FIG. 2, the present disclosure also provides a pressure coupled control method for diffusion combustion of a natural gas engine. The pressure coupled control method for diffusion combustion of the natural gas engine includes the following steps: S11: detecting an operating condition of the natural gas engine, such as determining the operating condition of the natural gas engine according to an accelerator signal and a speed signal of the natural gas engine; S12: calculating, by the electronic control unit 40, a target diesel fuel pressure value of diesel fuel flowing into the fuel rail 23 of the natural gas engine according to the operating condition, and detecting an actual diesel fuel pressure value of the diesel fuel flowing into the fuel rail 23 by the diesel fuel pressure sensor 24 in the fuel rail 23; S13: calculating, by the electronic control unit 40, a target natural gas pressure value of natural gas flowing into the gas rail 14 of the natural gas engine according to the actual diesel fuel pressure value, and adjusting the natural gas flowing into the gas rail 14 through a signal of the gas rail pressure sensor in the gas rail 14; S14: after the target diesel fuel pressure value and the target natural gas pressure value are established, injecting high-pressure diesel fuel and high-pressure natural gas into the cylinder 40 sequentially; and S15: detecting a real-time operating condition of the natural gas engine in real-time, and timely adjusting the target diesel fuel pressure value and the target natural gas pressure value according to the real-time operating condition. In the present disclosure, the diesel fuel and natural gas injected into the natural gas engine are pressure-coupled so that the diesel fuel and natural gas injected into the natural gas engine are fully combusted, thereby increasing the diffusion combustion efficiency of the natural gas engine. Specifically, the electronic control unit 40 of the present disclosure calculates the target diesel fuel pressure value of the diesel fuel flowing into the fuel rail 23 of the natural gas engine according to the operating condition of the engine, and detects the actual diesel fuel pressure value of the diesel fuel flowing into the fuel rail 23 through the diesel fuel pressure sensor 24 in the fuel rail 23; then, the electronic control unit 40 calculates the target natural gas pressure value of the natural gas flowing into the gas rail 14 of the natural gas engine according to the actual diesel fuel pressure value; finally, high-pressure diesel fuel and high-pressure natural gas are injected into the cylinder 30 sequentially by taking the target diesel fuel pressure value and the target natural gas pressure value as targets so as to realize a pressure-coupled control of the pressures of natural gas and diesel fuel injected into the cylinder 30 so that the high-pressure natural gas injected into the cylinder 30 can be fully diffused and combusted in the fire core formed by the high-pressure diesel fuel, thereby reducing the possible phenomena of knocking and burst pressure of the natural gas engine; at the same time, the compression ratio, power per liter and thermal efficiency of the natural gas engine are effectively improved. It should be noted that for the pressure coupled control method for diffusion combustion of the natural gas engine of the present disclosure, a control method for only one operating condition is elaborated. In the actual application process, in the pressure coupled control method for diffusion combustion of the natural gas engine of the present disclosure, the operating condition of the natural gas engine will be detected in real time, and the target diesel fuel pressure value and the target natural gas pressure value will be adjusted in time according to a change in the operating condition of the natural gas engine.

With continued reference to FIG. 1 and FIG. 2, according to the embodiment of the present disclosure, the natural gas engine is provided with the high-pressure fuel pump 22 and the fuel rail 23 that are located between the fuel tank 20 and the cylinder 30, wherein the fuel rail 23 is used to store high-pressure diesel fuel, the diesel fuel pressure sensor 24 is disposed in the fuel rail 23, and step S12 includes: S121: forming high-pressure diesel in the fuel rail 23 by controlling an fuel-pumping volume of the high-pressure fuel pump 22 according to the target diesel fuel pressure value; and S122: detecting the actual diesel fuel pressure value of the high-pressure diesel fuel flowing into the fuel rail 23 by the diesel fuel pressure sensor 24, and adjusting the fuel-pumping volume of the high-pressure fuel pump 22 according to the actual diesel fuel pressure value, so that the pressure value of the high-pressure diesel fuel in the fuel rail 23 reaches the target diesel fuel pressure value. In the present disclosure, by storing the high-pressure diesel fuel in the fuel rail 23 and adjusting the pressure value of the high-pressure diesel fuel in the fuel rail 23 to the target diesel fuel pressure value through the diesel fuel pressure sensor 24 in the fuel rail 23, the accuracy of the fuel pressure value of the high-pressure diesel fuel before being injected into cylinder 30 is improved, and the influence of the fuel pressure loss of the high-pressure diesel fuel in the fuel pipe of the fuel tank 20 on the fuel pressure value of the high-pressure diesel fuel is reduced.

With continued reference to FIG. 1 and FIG. 2, according to the embodiment of the present disclosure, the natural gas engine is provided with the natural gas pump 11 and the gas rail 14 that are located between the natural gas bottle 10 and the cylinder 30, wherein the gas rail 14 is used to store high-pressure natural gas, the natural gas pressure sensor 15 is disposed in the gas rail 14, and step S13 includes: S131: forming high-pressure natural gas in the gas rail 14 by controlling a gas-pumping volume of the natural gas pump 11 according to the actual diesel fuel pressure value; and S132: adjusting the gas-pumping volume of the natural gas pump 11 according to a natural gas pressure signal of the natural gas pressure sensor 15 in the gas rail 14 so that the pressure value of the high-pressure natural gas in the gas rail 14 reaches the target natural gas pressure value. In the present disclosure, by storing the high-pressure natural gas in the gas rail 14 and adjusting the pressure value of the high-pressure natural gas in the gas rail 14 to the target natural gas pressure value through the natural gas pressure sensor 15 in the fuel rail 14, the accuracy of the gas pressure of the high-pressure natural gas before being injected into the cylinder 30 is improved, and the influence of the gas pressure loss of the high-pressure natural gas in the gas pipe of the natural gas bottle 10 on the gas pressure value of the natural gas is reduced.

With continued reference to FIG. 1 and FIG. 2, according to the embodiment of the present disclosure, step S14 includes: S141: controlling the fuel injection nozzle 26 to inject the high-pressure diesel fuel into the cylinder 30 with a first injection pulse width at a first injection timing; and S142: controlling the gas injection nozzle 17 to inject the high-pressure natural gas into the cylinder 30 with a second injection pulse width at a second injection timing. Specifically, after the fuel pressure value of the high-pressure diesel fuel in the fuel rail 23 reaches the target diesel fuel pressure value and the gas pressure value of the high-pressure natural gas in the gas rail 14 reaches the target natural gas pressure value, the electronic control unit 40 accurately controls the first injection timing and the first injection pulse width of the high-pressure diesel fuel through the fuel injection solenoid valve 25 located at the fuel injection nozzle 26 of the cylinder 30 so that the high-pressure diesel fuel is compression-combusted in the cylinder 30. Finally, the electronic control unit 40 accurately controls the second injection timing and the second injection pulse width of the high-pressure natural gas through the gas injection solenoid valve 16 located at the gas injection nozzle 17 of the cylinder 30 so that the high-pressure natural gas is diffusion-combusted in the fire core formed by the high-pressure diesel fuel, thereby reducing the phenomena of knocking and burst pressure existing in ordinary premixed combustion and spark plug ignition engines; at the same time, the compression ratio, power per liter and thermal efficiency of the natural gas engine are effectively improved.

The above described are only preferred specific embodiments of the present disclosure, but the scope of protection of the present disclosure is not limited to this. The changes or replacements that can be easily conceived by any person skilled in the art within the technical scope disclosed by the present disclosure shall be covered within the scope of protection of the present disclosure. Therefore, the scope of protection of the present disclosure shall be accorded with the scope of protection of the claims.

The invention claimed is:

1. A pressure coupled control method for diffusion combustion of a natural gas engine, comprising the following steps:
   S11: detecting an operating condition of the natural gas engine;
   S12: calculating, by an electronic control unit, a target diesel fuel pressure value of diesel fuel flowing into an fuel rail of the natural gas engine according to the operating condition of the engine, and detecting an actual diesel fuel pressure value of the diesel fuel flowing into the fuel rail through a diesel fuel pressure sensor in the fuel rail;
   S13: calculating, by the electronic control unit, a target natural gas pressure value of natural gas flowing into a gas rail of the natural gas engine according to the actual diesel fuel pressure value, and adjusting the natural gas flowing into the gas rail through a signal of a gas rail pressure sensor in the gas rail;

S14: after the target diesel fuel pressure value and the target natural gas pressure value are established, injecting high-pressure diesel fuel and high-pressure natural gas into a cylinder sequentially; and S15: detecting a real-time operating condition of the natural gas engine in real-time, and timely adjusting the target diesel fuel pressure value and the target natural gas pressure value according to the real-time operating condition.

2. The pressure coupled control method for diffusion combustion of the natural gas engine according to claim 1, wherein step S11 comprises:

detecting the operating condition of the natural gas engine according to an accelerator signal and a speed signal of the natural gas engine.

3. The pressure coupled control method for diffusion combustion of the natural gas engine according to claim 2, wherein the natural gas engine is provided with a high-pressure fuel pump and the fuel rail that are located between an fuel tank and the cylinder, the fuel rail is used to store high-pressure diesel fuel, the diesel fuel pressure sensor is disposed in the fuel rail, and step S12 comprises:

S121: forming high-pressure diesel in the fuel rail by controlling an fuel-pumping volume of the high-pressure fuel pump according to the target diesel fuel pressure value; and S122: detecting the actual diesel fuel pressure value of the high-pressure diesel fuel flowing into the fuel rail through the diesel fuel pressure sensor, and adjusting the fuel-pumping volume of the high-pressure fuel pump according to the actual diesel fuel pressure value, so that the pressure value of the high-pressure diesel fuel in the fuel rail reaches the target diesel fuel pressure value.

4. The pressure coupled control method for diffusion combustion of the natural gas engine according to claim 3, wherein the natural gas engine is provided with a natural gas pump and the gas rail that are located between a natural gas bottle and the cylinder, the gas rail is used to store high-pressure natural gas, a natural gas pressure sensor is disposed in the gas rail, and step S13 comprises:

S131: forming high-pressure natural gas in the gas rail by controlling a gas-pumping volume of the natural gas pump according to the actual diesel fuel pressure value; and S132: adjusting the gas-pumping volume of the natural gas pump according to a natural gas pressure signal of the natural gas pressure sensor in the gas rail so that the pressure value of the high-pressure natural gas in the gas rail reaches the target natural gas pressure value.

5. The pressure coupled control method for diffusion combustion of the natural gas engine according to claim 4, wherein step S14 comprises:

S141: controlling an fuel injection nozzle to inject the high-pressure diesel fuel into the cylinder with a first injection pulse width at a first injection timing; and S142: controlling a gas injection nozzle to inject the high-pressure natural gas into the cylinder with a second injection pulse width at a second injection timing.

6. A pressure coupled control system for diffusion combustion of a natural gas engine, comprising:

a detection unit, which is connected to an electronic control unit of the natural gas engine and which is configured to detect an operating condition of the natural gas engine and send the operating condition to the electronic control unit;

a first computing unit, which is integrated in the electronic control unit and which is configured to calculate a target diesel fuel pressure value of diesel fuel flowing into an fuel rail of the natural gas engine according to the operating condition and detect an actual diesel fuel pressure value of the diesel fuel flowing into the fuel rail through a diesel fuel pressure sensor in the fuel rail;

a second computing unit, which is integrated in the electronic control unit and which is configured to calculate a target natural gas pressure value of natural gas flowing into a gas rail of the natural gas engine according to the actual diesel fuel pressure value and adjust the natural gas flowing into the gas rail through a signal of a gas rail pressure sensor in the gas rail; and an injection unit, which is configured to inject high-pressure diesel fuel and high-pressure natural gas into a cylinder sequentially after the target diesel fuel pressure value and the target natural gas pressure value are established.

7. The pressure coupled control system for diffusion combustion of the natural gas engine according to claim 6, wherein the detection unit comprises:

an accelerator pedal displacement sensor, which is configured to detect an accelerator signal of the accelerator pedal; and a phase sensor, which is disposed on the natural gas engine to detect a speed signal of the natural gas engine.

8. The pressure coupled control system for diffusion combustion of the natural gas engine according to claim 7, wherein the natural gas engine is provided with a high-pressure fuel pump and the fuel rail that are located between an fuel tank and the cylinder, the fuel rail is used to store high-pressure diesel fuel, and the pressure coupled control system for diffusion combustion of the natural gas engine further comprises:

a diesel fuel pressure adjustment unit, which is integrated in the high-pressure fuel pump and connected with the electronic control unit, and which controls an fuel-pumping volume of the high-pressure fuel pump according to the target diesel fuel pressure value so that high-pressure diesel is formed in the fuel rail; and a diesel fuel pressure sensor, which is disposed in the fuel rail and connected to the diesel fuel pressure adjustment unit, and which is configured to detect the actual diesel fuel pressure value of the high-pressure diesel fuel flowing into the fuel rail, wherein the diesel fuel pressure adjustment unit adjusts the fuel-pumping volume of the high-pressure fuel pump according to the actual diesel fuel pressure value, so that the pressure value of the high-pressure diesel fuel in the fuel rail reaches the target diesel fuel pressure value.

9. The pressure coupled control system for diffusion combustion of the natural gas engine according to claim 8, wherein the natural gas engine is provided with a natural gas pump and the gas rail that are located between a natural gas bottle and the cylinder, the gas rail is used to store high-pressure natural gas, and the pressure coupled control system for diffusion combustion of the natural gas engine further comprises:

a natural gas pressure adjustment unit, which is connected to the electronic control unit and the natural gas pump respectively, and which controls a gas-pumping volume of the natural gas pump according to the actual diesel fuel pressure value to form high-pressure natural gas in the gas rail; and a natural gas pressure sensor, which is disposed in the gas rail and connected to the natural gas pressure adjustment unit, wherein the natural gas pressure adjustment unit adjusts the gas-pumping volume of the natural gas pump according to a natural gas pressure signal of the natural gas pressure sensor in the gas rail so that the pressure value of the high-pressure natural gas in the gas rail reaches the target natural gas pressure value.

10. The pressure coupled control system for diffusion combustion of the natural gas engine according to claim 9, further comprising:

an fuel injection solenoid valve, which is connected to the electronic control unit, wherein the electronic control unit controls an fuel injection nozzle through the fuel injection solenoid valve to inject the high-pressure diesel fuel into the cylinder with a first injection pulse width at a first injection timing; and a gas injection solenoid valve, which is connected to the electronic control unit, wherein the electronic control unit controls a gas injection nozzle through the gas injection solenoid valve to inject the high-pressure natural gas into the cylinder with a second injection pulse width at a second injection timing.

* * * * *